United States Patent
Ito

(10) Patent No.: US 12,083,956 B2
(45) Date of Patent: Sep. 10, 2024

(54) VEHICLE-APPROACH NOTIFICATION DEVICE

(71) Applicant: SUBARU CORPORATION, Tokyo (JP)

(72) Inventor: Takuya Ito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 96 days.

(21) Appl. No.: 17/940,545

(22) Filed: Sep. 8, 2022

(65) Prior Publication Data

US 2023/0086076 A1 Mar. 23, 2023

(30) Foreign Application Priority Data

Sep. 21, 2021 (JP) ................................ 2021-153385

(51) Int. Cl.
*B60Q 5/00* (2006.01)
(52) U.S. Cl.
CPC .................................. *B60Q 5/008* (2013.01)
(58) Field of Classification Search
None
See application file for complete search history.

(56) References Cited

U.S. PATENT DOCUMENTS

| | | | | |
|---|---|---|---|---|
| 4,442,512 A * | 4/1984 | Kodera | ............... | B60G 17/0165 340/904 |
| 4,460,061 A * | 7/1984 | Dodge | ................... | G10K 11/26 181/175 |
| 4,594,729 A * | 6/1986 | Weingartner | ............. | H04S 5/02 381/86 |
| 5,131,612 A * | 7/1992 | Skantar | ................... | B61L 23/00 246/107 |
| 7,191,022 B1 * | 3/2007 | Kakuhari | ............... | H04R 27/00 381/89 |
| 8,891,782 B2 * | 11/2014 | Kim | ......................... | H04R 3/12 381/71.7 |
| 9,073,477 B2 * | 7/2015 | Tsuzuki | .................. | B60Q 5/008 |
| 10,932,037 B2 * | 2/2021 | Winton | ..................... | H04R 5/02 |
| 2002/0070073 A1 * | 6/2002 | Matsumoto | ........... | F22B 37/486 181/182 |
| 2010/0119096 A1 * | 5/2010 | Suzuki | ..................... | G10K 9/20 181/182 |
| 2013/0106590 A1 * | 5/2013 | Nakayama | ................ | B60L 3/00 340/425.5 |
| 2013/0233147 A1 * | 9/2013 | Ostendorf | ................ | G10D 7/10 84/398 |
| 2013/0249680 A1 * | 9/2013 | Goto | ....................... | B60Q 5/008 340/425.5 |
| 2013/0265150 A1 * | 10/2013 | Nakayama | ............. | H04R 23/00 340/425.5 |

(Continued)

FOREIGN PATENT DOCUMENTS

JP 05-213112 A 8/1993

*Primary Examiner* — Fekadeselassie Girma
(74) *Attorney, Agent, or Firm* — Rimon P.C.

(57) ABSTRACT

A vehicle-approach notification device includes a sound emitter and at least two ducts. The sound emitter is provided in the vehicle, has an aperture, and is configured to emit a notification sound from the aperture to outside the vehicle. The at least two ducts are provided in the vehicle, have different lengths, and each have an end communicating with the aperture.

6 Claims, 4 Drawing Sheets

(56) References Cited

U.S. PATENT DOCUMENTS

| | | | | |
|---|---|---|---|---|
| 2013/0314224 A1* | 11/2013 | Nakayama | ............... | B60Q 5/00 |
| | | | | 340/463 |
| 2013/0315418 A1* | 11/2013 | Nakayama | .............. | B60R 19/48 |
| | | | | 381/86 |
| 2014/0015654 A1* | 1/2014 | Nakayama | ............. | G10K 11/28 |
| | | | | 340/425.5 |
| 2015/0061850 A1* | 3/2015 | Omote | ................... | B60Q 5/008 |
| | | | | 340/425.5 |
| 2019/0066655 A1* | 2/2019 | Ino | .......................... | G10K 9/13 |

* cited by examiner

VEHICLE-APPROACH NOTIFICATION DEVICE

CROSS-REFERENCE TO RELATED APPLICATIONS

The present application claims priority from Japanese Patent Application No. 2021-153385 filed on Sep. 21, 2021, the entire contents of which are hereby incorporated by reference.

BACKGROUND

The disclosure relates to vehicle-approach notification devices, for example, to a vehicle-approach notification device that is to be provided in a vehicle drivable by an electric motor provided as a power source and is configured to emit to the outside of the vehicle a notification sound for notifying of the approach of the vehicle.

Electrically drivable vehicles having electric motors provided as power sources, including electric vehicles (EVs) and hybrid electric vehicles (HEVs), do not tend to make a loud sound such as an engine sound when being driven by the electric motors. Since the driving sound of electrically drivable vehicles is low, it is difficult for pedestrians to notice the approach of electrically drivable vehicles.

To make pedestrians notice the presence of electrically drivable vehicles by hearing, electrically drivable vehicles are provided with vehicle-approach notification devices configured to emit to the outside of the vehicles notification sounds for notifying of the approach of the vehicles that are being driven by electric motors.

Such a vehicle-approach notification device is described by Japanese Unexamined Patent Application Publication No. H5-213112, in which a signal is generated as the source of a notification sound by a control unit provided in a vehicle. The sound signal thus generated is amplified by an amplifier and is then emitted to the outside of the vehicle from a speaker provided in a front part of the vehicle.

SUMMARY

An aspect of the disclosure provides a vehicle-approach notification device includes a sound emitter and at least two ducts. The sound emitter is provided in a vehicle, has an aperture, and is configured to emit a notification sound from the aperture to outside the vehicle. The at least two ducts are provided in the vehicle, have different lengths, and each have an end communicating with the aperture.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

In recent years, many countries have developed laws and regulations for notification sounds to be emitted from vehicle-approach notification devices. According to a Japanese regulation, for example, notification sounds for notifying of the approach of electrically drivable vehicles that are traveling at low speeds are to have sound pressures greater than or equal to a specified level in each of two frequency bands within a predetermined frequency range.

The above regulation may be met by a method in which a composite sound having two peak frequency bands is employed as the source of the notification sound. However, if a single sound source having two peak frequency bands is applied to vehicles of a plurality of models, differences in acoustic characteristics of the speaker and peripheral elements between different vehicle models may make it difficult for some vehicle models to meet the specified sound pressure.

The above problem may be solved by another method in which the peak frequency bands of the sound source are varied in correspondence with vehicle models. However, such a method accompanies a change in the specifications of the control unit. To increase the sound pressure of the notification sound without changing the sound source, the size of the speaker or the amplifier may be increased. However, large acoustic devices tend to be expensive and increase the manufacturing cost.

In view of the above, it is desirable to provide a vehicle-approach notification device configured to amplify the sound pressure of the notification sound in a plurality of frequency bands without changing the sound source so that the increase in the manufacturing cost is reduced.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
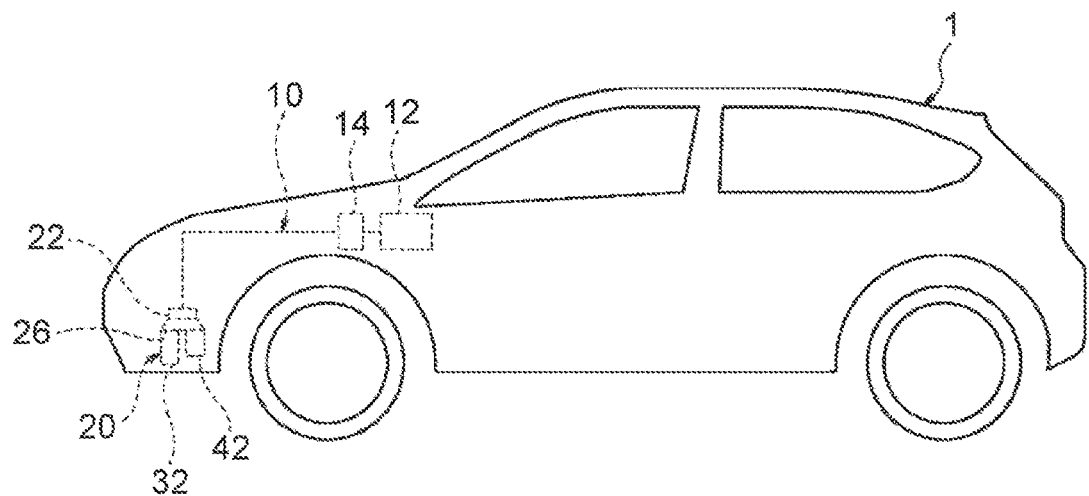
FIG. 1 schematically illustrates a vehicle-approach notification device according to an embodiment of the disclosure.

FIG. 1 schematically illustrates a vehicle-approach notification device 10 according to an embodiment of the disclosure. The vehicle-approach notification device 10 is provided in an electrically drivable vehicle 1, which is an electric vehicle, a hybrid electric vehicle, or the like that includes an electric motor provided as a power source.

While the vehicle 1 is being driven by the electric motor, the vehicle-approach notification device 10 emits a notification sound that notifies pedestrians around the vehicle 1 of the approach of the vehicle 1.

Figure 2:
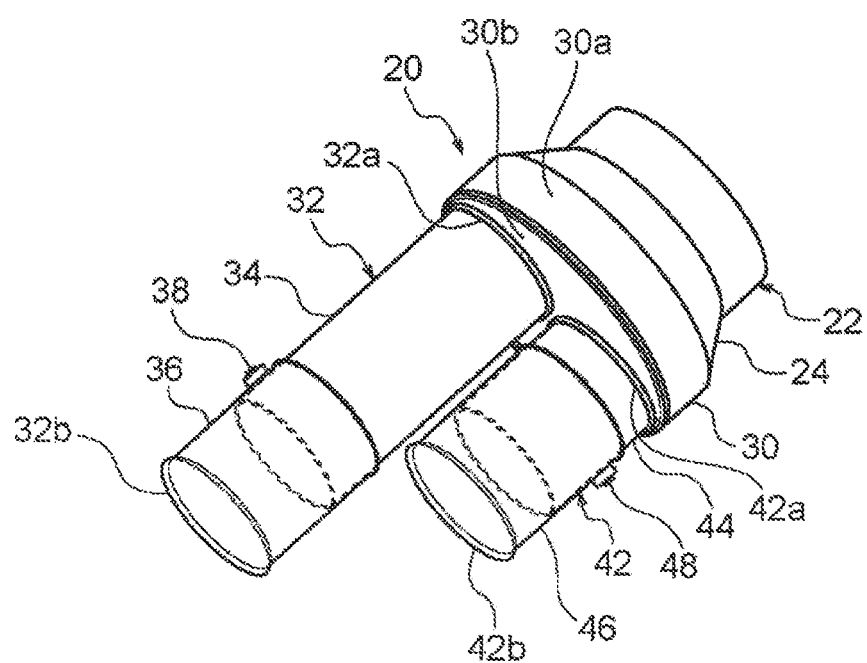
FIG. 2 is a perspective view of a sound-emitting unit included in the vehicle-approach notification device.
Figure 3:
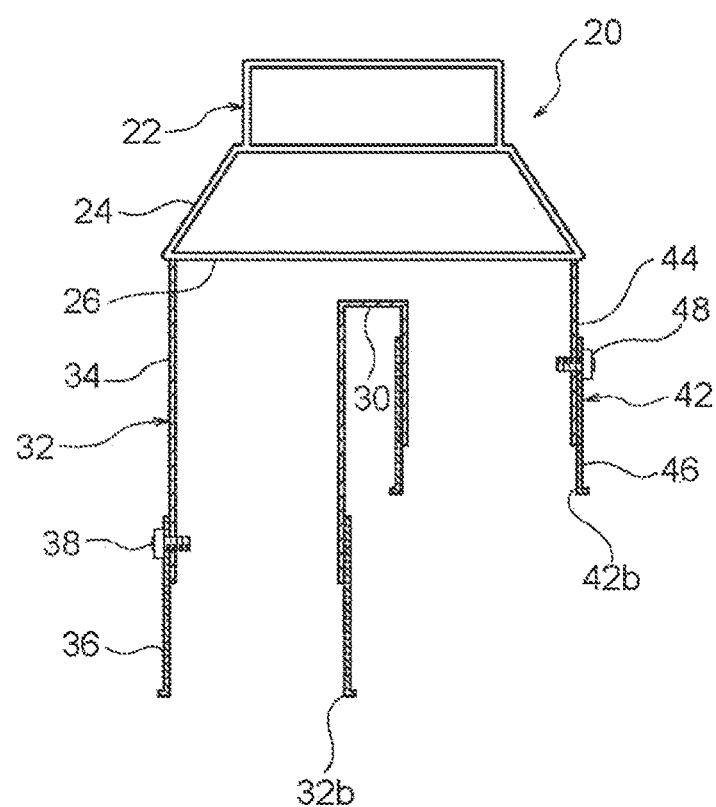
FIG. 3 is a schematic sectional view of the sound-emitting unit of the vehicle-approach notification device.

The vehicle-approach notification device 10 includes a control unit 12, an amplifier 14, and a sound-emitting unit 20. The control unit 12 is configured to generate a sound signal as the source of the notification sound. The amplifier 14 is configured to amplify the sound signal. The sound-emitting unit 20 is configured to emit the notification sound to the outside of the vehicle 1. Referring to FIGS. 2 and 3, the sound-emitting unit 20 includes a speaker 22 and a plurality of ducts 32 and 42. In one embodiment, the speaker 22 serves as a "sound emitter". The ducts 32 and 42 each communicate with the speaker 22. Referring to FIG. 1, the control unit 12, the amplifier 14, and the speaker 22 are electrically coupled to one another.

The control unit 12 is a calculator including a microcomputer. The control unit 12 includes an information processor such as a central processing unit (CPU) or an application-specific integrated circuit (ASIC), a storage such as a random access memory (RAM) or a read-only memory (ROM), and so forth. In one example, the control unit 12 serves as a multifunction-achieving unit (serving as a controller, an arithmetic unit, a processor, and so forth) in which the CPU reads and executes programs stored in the storage. The control unit 12 receives information on the state of the vehicle 1 from relevant sensors (not illustrated). With reference to the information, the control unit 12 generates a sound signal as the source of the notification sound to be emitted from the sound-emitting unit 20. The present embodiment relates to an exemplary case where the sound signal as the source of the notification sound is generated when the vehicle 1 is in a low-speed, motor-driving mode, that is, when the vehicle 1 is driven by the electric motor and at a predetermined speed or lower. The source of the notification sound to be generated by the control unit 12 according to the present embodiment is, for example, a white noise, which has a sound pressure that is substantially constant over a predetermined wide frequency range.

The amplifier 14 is disposed between the control unit 12 and the speaker 22 and is configured to amplify the sound signal generated by the control unit 12.

The sound-emitting unit 20 includes the speaker 22 and the two ducts 32 and 42. The ducts 32 and 42 have different lengths. Hereinafter, the longer duct is referred to as the first duct 32, and the shorter duct is referred to as the second duct 42. The sound-emitting unit 20 is disposed in a front part of the vehicle 1.

The speaker 22 is attached to an engine lower cover, which forms a part of the floor of the vehicle 1. The speaker 22 includes a frame 24, which has a substantially truncated conical shape with the diameter thereof increasing from the plane of sound emission. The frame 24 has at the distal end thereof a substantially circular aperture 26. The sound signal generated by the control unit 12 is amplified by the amplifier 14 and is then emitted as a notification sound from the aperture 26 of the speaker 22.

Referring to FIGS. 2 and 3, the first duct 32 and the second duct 42 each have a circular cylindrical shape and each communicate with one end 32a or 42a thereof to the aperture 26 of the speaker 22. The first duct 32 and the second duct 42 have substantially the same inside diameter and substantially the same outside diameter. The shape of each of the ducts 32 and 42 is not limited to a circular cylinder and may be, for example, a cylinder with a polygonal cross section, or a cylinder with a semicircular cross section that is one of the halves, substantially, of the aperture 26. The shape of the aperture 26 of the speaker 22 is not limited to a circle and may be changed in correspondence with the shapes of the ducts 32 and 42. As illustrated in FIG. 2, the ducts 32 and 42 according to the present embodiment are coupled to the aperture 26 with a duct coupler 30 interposed therebetween.

The duct coupler 30 includes a cylindrical member 30a and a cover 30b. The cylindrical member 30a is continuous with the aperture 26. The cover 30b is attached to the distal end of the cylindrical member 30a. The cylindrical member 30a has substantially the same inside diameter as the aperture 26 of the speaker 22. In some embodiments, the axial length of the cylindrical member 30a is substantially the same as or shorter than the axial length of the frame 24 of the speaker 22. The cover 30b has a disc shape and covers the distal end of the cylindrical member 30a. The cover 30b has two circular openings. The two openings of the cover 30b receive the one ends 32a and 42a of the ducts 32 and 42, respectively.

The first duct 32 and the second duct 42 extend linearly and parallel to each other from the aperture 26 of the speaker 22. The ducts 32 and 42 include respective cylindrical bases 34 and 44, and respective length adjusters 36 and 46. The bases 34 and 44 have the one ends 32a and 42a, respectively, which are coupled to the duct coupler 30, thereby being fixed to the aperture 26. The length adjusters 36 and 46 are coupled to the distal ends of the respective bases 34 and 44. The length adjusters 36 and 46 have respective end openings 32b and 42b, which are at the distal ends of the respective ducts 32 and 42. The base 34 of the first duct 32 is longer than the base 44 of the second duct 42.

The length adjusters 36 and 46 are provided for length adjustment of the respective ducts 32 and 42. The length adjusters 36 and 46 each have a cylindrical shape with substantially the same diameter as a corresponding one of the bases 34 and 44 and are slidable in the axial direction of the bases 34 and 44. After the lengths of projection of the length adjusters 36 and 46 from the bases 34 and 44 are adjusted, the length adjusters 36 and 46 are fastened to the bases 34 and 44 with respective fastening members 38 and 48, which are bolts or the like. The lengths of the ducts 32 and 42 may be set according to circumstances. For example, the lengths of the bases 34 and 44 and the lengths of the length adjusters 36 and 46 may be set such that the first duct 32 has a length that is 1.5 times to 5 times the length of the second duct 42.

Referring to FIG. 1, the sound-emitting unit 20 according to the present embodiment is oriented such that the aperture 26 of the speaker 22 faces the lower side of the vehicle 1 and the ducts 32 and 42 extend linearly downward from the aperture 26. In some embodiments, the sound-emitting unit 20 is disposed at the width-direction center of the vehicle 1.

For easy perception of the two ducts 32 and 42, FIG. 1 illustrates a case where the first duct 32 is disposed on the front side of the vehicle 1 with respect to the second duct 42. The arrangement of the ducts 32 and 42 is not limited to such a case. The second duct 42 may be disposed on the front side of the vehicle 1 with respect to the first duct 32, or the first duct 32 and the second duct 42 may be disposed side by side in the width direction of the vehicle 1 at substantially the same front-to-rear position of the vehicle 1. The position and the orientation of the sound-emitting unit 20 are not limited to those illustrated in FIG. 1 and may be determined in correspondence with the shape of the vehicle 1. Moreover, a single vehicle 1 may include a plurality of sound-emitting units 20.

Figure 4:
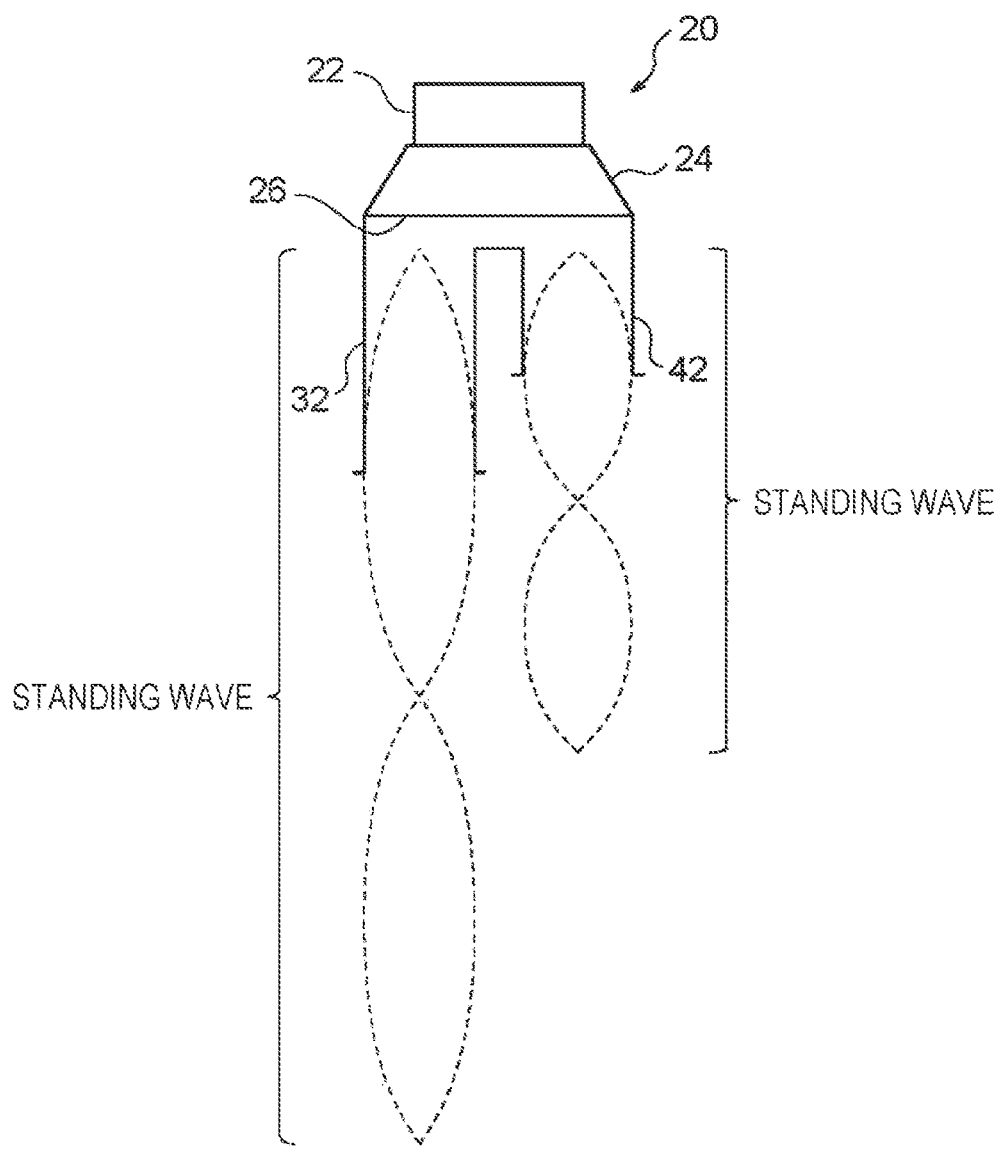
FIG. 4 illustrates how the sound-emitting unit amplifies sound pressure.

In the above vehicle-approach notification device 10, the notification sound emitted from the aperture 26 of the speaker 22 travels through the ducts 32 and 42 and goes out of the ducts 32 and 42 through the end openings 32b and 42b. Referring to FIG. 4, in each of the ducts 32 and 42, the sound coming from the speaker 22 and the sound reflected inside a corresponding one of the ducts 32 and 42 interfere with each other to generate a standing wave having a wavelength that is four times the length of a corresponding one of the ducts 32 and 42. Thus, the sound pressure of the notification sound is amplified in each of two frequency bands in which the standing wave is generated.

Figure 5:
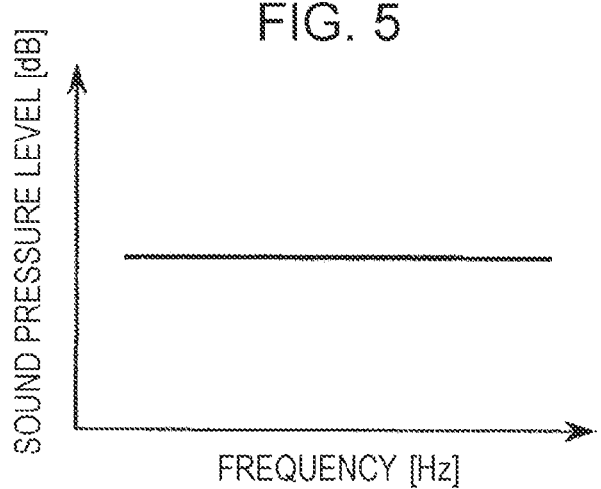
FIG. 5 is a graph illustrating the frequency and the sound pressure level of a notification sound at the point of emission from a speaker.
Figure 6:
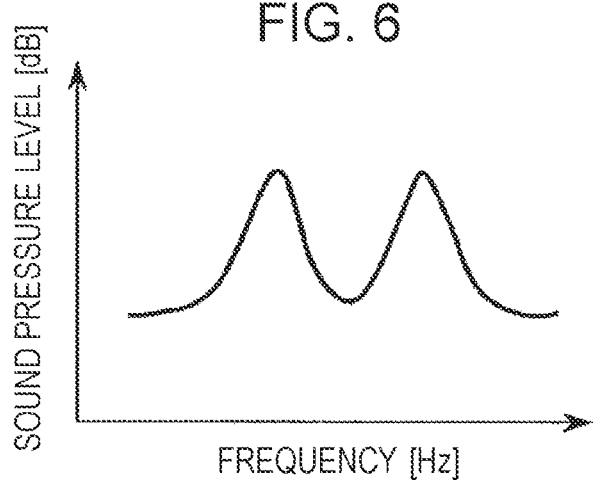
FIG. 6 is a graph illustrating the frequency and the sound pressure level of the notification sound at the point of emission from ducts.

FIG. 5 is a graph illustrating the frequency and the sound pressure level of the notification sound at the point of emission from the speaker 22. FIG. 6 is a graph illustrating the frequency and the sound pressure level of the notification sound at the point of emission from the ducts 32 and 42. As described above, the source of the notification sound according to the present embodiment is a white noise. Therefore, as illustrated in FIG. 5, the sound pressure level of the notification sound at the point of emission from the speaker 22 is substantially constant over a wide frequency band. When such a notification sound travels through the ducts 32 and 42 and goes out of the ducts 32 and 42 through the end openings 32b and 42b, the notification sound has two peak frequency bands corresponding to the respective lengths of the ducts 32 and 42 as illustrated in FIG. 6, because the above standing waves are generated in the respective ducts 32 and 42.

The lengths of the ducts 32 and 42 that determine the two peak frequency bands are set in correspondence with the shape of the vehicle 1 in which the vehicle-approach notification device 10 is to be provided. For example, the lengths of the ducts 32 and 42 are set in correspondence with the acoustic characteristics determined by the shape of the vehicle 1 around the sound-emitting unit 20 and such that, at the point of emission of the notification sound from the vehicle 1 to the outside, the frequency bands where the sound pressure is increased in correspondence with the acoustic characteristics determined by the shape of the vehicle 1 become substantially the same as the frequency bands of the standing waves that are determined by the lengths of the ducts 32 and 42.

As described above, the vehicle-approach notification device 10 according to the present embodiment includes the two ducts 32 and 42 having different lengths and communicating with the speaker 22. Therefore, the sound pressure of the notification sound is amplified in any two frequency bands, with no change in the source of the notification sound. Such a configuration makes it possible to amplify the sound pressure in any two frequency bands that match the shape of the vehicle 1 by simply changing the lengths of the ducts 32 and 42 without changing the source of the notification sound to be generated by the control unit 12, even in cases where the vehicle-approach notification device 10 is applied to vehicles 1 of different models, or in cases where the acoustic characteristics of the speaker 22 and peripheral elements have changed with minor changes made to the vehicle 1.

In the present embodiment, the lengths of the ducts 32 and 42 are adjustable with the length adjusters 36 and 46. Alternatively, the lengths of the ducts 32 and 42 included in the vehicle-approach notification device 10 may be fixed. If the vehicle-approach notification device 10 includes the length adjusters 36 and 46 as in the present embodiment, the lengths of the ducts 32 and 42 are easily adjustable by sliding the length adjusters 36 and 46 with respect to the bases 34 and 44, without changing the specifications of other elements of the vehicle-approach notification device 10. Such a configuration is applicable to various vehicle models and is highly versatile.

Furthermore, since a white noise, which has no particular peak frequency bands, is used as the source of the notification sound, any peak frequency bands that match the acoustic characteristics of the vehicle model of interest are obtained easily by adjusting the lengths of the ducts 32 and 42.

Figure 7:
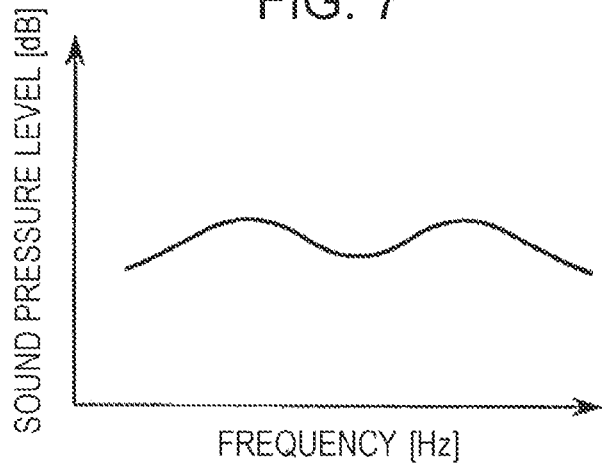
FIG. 7 is a graph illustrating the frequency and the sound pressure level of a notification sound at the point of emission from a speaker according to an embodiment of the disclosure.

The source of the notification sound is not limited to a white noise and may be a sound having, as illustrated in FIG. 7, a frequency spectrum with gentle peaks within the predetermined frequency range. FIG. 7 illustrates such a frequency spectrum of the sound pressure level that has gentle peaks in the respective frequency bands where the sound pressure is to be amplified by the two ducts 32 and 42. Using such a sound source increases the difference between the sound pressure in the frequency bands to be amplified by the ducts 32 and 42 and the sound pressure in the other frequency bands. Thus, the peaks of the sound pressure in the predetermined frequency bands are made greater, whereas the sound pressure in the other frequency bands is reduced, whereby irrelevant noises are reduced.

The disclosure is not limited to the above embodiments, and various changes can be made to the above embodiments without departing from the essence of the disclosure.

For example, the number of ducts to communicate with the aperture 26 of the speaker 22 is not limited to two. Three or more ducts having different lengths may be coupled to the aperture 26. In that case, a standing wave is generated in each of three or more frequency bands.

The vehicle-approach notification device according to the disclosure makes it possible to amplify the sound pressure in a plurality of frequency bands without changing the sound source, whereby the increase in the manufacturing cost is reduced.

The invention claimed is:

1. A vehicle-approach notification device comprising:
   a sound emitter provided in a vehicle, the sound emitter having an aperture and being configured to emit a notification sound from the aperture to outside the vehicle; and
   at least two ducts provided in the vehicle, the at least two ducts having different lengths and each having an end communicating with the aperture,
   wherein each of the at least two ducts comprises:
      a cylindrical base having an end coupled to the aperture; and
      a cylindrical length adjuster slidably coupled to a distal end part of the cylindrical base such that the cylindrical length adjuster is operable to slide along the distal end part to adjust a length of the duct.

2. The vehicle-approach notification device according to claim 1,
   wherein a source of the notification sound is a white noise having a sound pressure that is substantially constant over a predetermined wide frequency range.

3. The vehicle-approach notification device according to claim 1,
   wherein the at least two ducts each have a circular cylindrical shape.

4. The vehicle-approach notification device according to claim 2,
   wherein the at least two ducts each have a circular cylindrical shape.

5. A vehicle-approach notification device comprising:
   a sound emitter disposed in a vehicle;
   first and second ducts coupled to the sound emitter, the first and second ducts extending linearly; and
   a frame coupling the first and second ducts with the sound emitter,
   wherein the frame has a first end having a first opening with a first area, and a second opening with a second area greater than the first area,
   wherein the first duct has a first length and the second duct has a second length longer than the first length, and
   wherein one end of the first duct and one end of the second duct are coupled to the second opening of the frame so that a notification sound from the sound emitter is emitted from another end of the first duct and another end of the second duct through the frame.

6. The vehicle-approach notification device according to claim 5, each of the first and second ducts comprises:
   a cylindrical base having an end coupled to the second opening; and
   a cylindrical length adjuster slidably coupled to a distal end part of the cylindrical base such that the cylindrical length adjuster is operable to slide along the distal end part to adjust a length of the duct.

\* \* \* \* \*